United States Patent [19]

Howell

[11] 3,848,465

[45] *Nov. 19, 1974

[54] AIR MOMENTUM ANEMOMETER

[76] Inventor: Wallace E. Howell, R.F.D. 3 Box 400, Golden, Colo. 80401

[ * ] Notice: The portion of the term of this patent subsequent to Mar. 6, 1990, has been disclaimed.

[22] Filed: Dec. 29, 1972

[21] Appl. No.: 319,551

Related U.S. Application Data

[63] Continuation-in-part of Ser. No. 131,120, April 5, 1971, Pat. No. 3,719,079.

[52] U.S. Cl. .................. 73/194 R, 73/189, 73/228
[51] Int. Cl. .............................................. G01f 1/00
[58] Field of Search..... 73/189, 194 R, 194 M, 202, 73/228

[56] References Cited
UNITED STATES PATENTS

| | | | |
|---|---|---|---|
| 2,060,848 | 10/1936 | Boyle | 73/202 |
| 2,897,672 | 8/1959 | Glasbrenner et al. | 73/228 |
| 3,038,334 | 6/1962 | Li | 73/194 M |
| 3,343,413 | 9/1967 | South et al. | 73/194 |

Primary Examiner—Richard C. Queisser
Assistant Examiner—John P. Beauchamp
Attorney, Agent, or Firm—Richard L. Stevens

[57] ABSTRACT

A device for the measurement of horizontal wind velocity, especially low wind velocity. The horizontal component of momentum of the airstream is displaced from its normal flow. This is accomplished by either injecting an air jet into the airstream to displace the horizontal component of momentum, or withdrawing from the airstream, over an inlet, into which inlet is drawn the horizontal component of the momentum of the airstream. The horizontal momentum flux of the air is converted to a horizontal force which is thus sensed and measured by a transducer, and since the force transduced is proportional to the first power of wind speed, large forces which may be accurately measured are achieved at low wind speeds. The force which is sensed and measured is converted to a pulsing variable superimposed on a null signal or on a signal of constant magnitude. The conversion of the pulsing or oscillating signal in this manner overcomes the problem of zero drift.

13 Claims, 13 Drawing Figures

AIR STREAM

AIR MOMENTUM ANEMOMETER

CROSS REFERENCE TO RELATED APPLICATIONS

This application is a continuation-in-part of my previously filed application, Ser. No. 131,120 filed Apr. 5, 1971, now U.S. Pat. No. 3,719,079.

BACKGROUND OF THE INVENTION

My invention is directed to a device for the measurement of wind velocity, particularly velocities at very low speeds. Presently available today are a number of types of anemometers, but all are subject to deficiencies or shortcomings at low wind speeds. One group of anemometers comprises cups or propeller-like mills that are moved by the wind at rates of speed roughly proportional to the wind speed. These generally function well at moderate wind speed where the force causing the motion is large compared to the frictional forces in the instruments themselves; but most anemometers of this type become unreliable at wind speeds of less than about 0.5 meters per second and tend to stall at some speed not much lower than this. A second type of anemometer is operated by the pressure of the wind on a pressure sensor of some sort. One type of anemometer or fluid measuring device wherein pressure differentials are measured is exemplified by U.S. Pat. No. 3,343,413, South. Another type may be similar to the air speed indicator of an airplane, or, in a primitive form, may be nothing more complicated than a hanging plate blown away from the vertical by the force of the wind. This type of device suffers from the fact that the pressure of the wind is proportional to the square of its velocity and at very low velocities the square becomes very small indeed. For example, a wind of 10 centimeters per second exerts a pressure of only $6 \times 10^{-2}$ dynes per centimeters square. Thus it would have to impinge on the surface of about 1.7 square meters to exert a force equivalent to the weight of 1 gram.

Still another type of anemometer widely used for very low speeds is tha hot wire or hot film type in which heat removal from a very fine wire or filament increases with wind speed. These instruments have not become particularly widespread in the field because of the mechanical fragility and electrical complication; for instance, involved with the necessity of taking the square root of the fluctuations in the hot wire resistance as a measure of wind pressure and the fourth root as a measure of velocity; and interference from fog, rain, and snow. Still a further anemometer depends upon the Doppler effect by which the sound waves are propagated at the speed of sound plus the vector speed of wind and so cover different distances and different directions in a given time depending upon the speed and direction of wind.

In my parent application, the structure and function of an anemometer is described in detail. Briefly, the anemometer senses and measures the momentum flux of a displaced portion of an airstream. The displaced momentum flux is converted into a force proportional to the wind velocity. This force is measured directly such as by strain gages, the output of which varies linearly with the strain imposed on the gages, but with arbitrary output under zero strain conditions, requiring electronic null balancing. This null balance has a tendancy to drift with time, limiting the accuracy with which small signals can be recorded over an extended period of time without re-setting of the zero adjustment.

SUMMARY OF THE INVENTION

As described in the parent application, the anemometer operates by sensing and measuring the momentum flux of air which, unlike the pressure, varies linearly with wind velocity. The velocity of the air to be measured in the environment flowing along a path is displaced from its travel along said path by a force acting substantially normal to the direction of flow of the airstream.

The energy flux due to the motion of a stream of air, equal to the mass flux times half the square of the velocity, may be interpreted as a dynamic pressure operating over the cross-section area of the stream, or alternatively as the momentum flux times half the velocity. The momentum flux of a sampled portion of the airstream is transduced into a force proportional to the wind velocity with a transducer for measuring the magnitude and direction of this force.

The motion of an airstream includes not only the velocity of the stream as a whole but also its vorticity, so that the vortical momentum flux is also a property of the airstream. In this specification the term "velocity"' 'includes the vortical as well as translational components of the motion of the airstream and the term "momentum" or "momentum flux" includes the vortical as well as orthogonal components of momentum or momentum flux, and the force includes the rotational as well as translational components of the net force.

The momentum flux of a sample of the environmental air is converted into a force propertional to that momentum flux exerted on an element of the device in such a manner that the force may be measured. THe force developed is propertional to the first power of the wind velocity. All devices presently available in the state of the art that transduce forces from the wind in order to measure the wind velocity produce forces that vary as the square of the wind speed and hence produce very small forces at very low wind speeds.

The present invention is directed to an apparatus and method for measuring the velocity and/or vorticity of an airstream. The invention includes an apparatus and method wherein a portion of the airstream is displaced from its flow path and the momentum flux of this displaced portion is sensed and measured.

My invention is directed to an apparatus and method wherein a continuous signal, which varies linearly with the force of the momentum flux withdrawn from an airstream, is converted to a discontinuous signal. In the preferred embodiment of the invention, the continuous signal is converted to a discontinuous signal by generating an alternating signal at a fixed frequency and superimposing this alternating signal on the continuous signal. Preferably, the signal to be measured, when converted, alternates between a null signal and the signal to be measured. More specifically, the continuous flow of the displaced portion of the airstream has an alternating signal imposed thereon. This may be accomplished by generating a velocity fluctuation and superimposing this velocity fluctuation on the displaced portion of the airstream. Preferably, this is accomplished by generating an acoustic oscillation. The displaced portion of the airstream is continuously drawn through a conduit and an oscillatory component of air velocity is superimposed thereon.

In other embodiments of my invention, the discontinuous signal may be generated in various ways. In one embodiment the signal may be interrupted by a separate electrical signal. e.g., an off-on signal. In another embodiment, the flow rate of the momentum flux sensed may be varied.

To interrupt or vary the continuous flow or displaced portion of the airstream of which the transducer which will sense and convert the momentum flux, whether withdrawn by suction, i.e., a fan, or displaced by a jet stream, means may be provided upstream of the transducer. A shutter arrangement, a rotation disc having alternating apertures therein, or a rotation blade are illustrative of various structures which may be used to interrupt the continuous flow of the displaced portion of the airstream. In this embodiment a sub-acoustical fluctuation is provided which could be sinusoidial, square wave, etc.

The flow of the displaced portion of the airstream to the transducer may also be varied by directly controlling the displacement of the airstream. For example, when the airstream is withdrawn, a pulsating vacuum may be applied such as by a reciprocating displacement piston. Also, a jet of air may be alternately pulsed into the airstream to displace the portion of the airstream. If desired, any combination of the above may be used, that is interrupting the continuous displacement of the airstream and/or displacing intermittently a portion of the airstream. In a still further embodiment of the invention, the signal generated by the continuous displacement of a portion of the airstream may be pulsed such as by applying an alternating signal to the signal transmitted by the transducer.

The apparatus of my invention includes means to displace a portion of an airstream from its flow path in a direction substantially normal to the flow path, means to sense and convert the momentum flux of the displaced portion of the airstream into a force corresponding to the displaced momentum flux, means to generate a signal corresponding to said force and means to control the signal generated whereby zero drift conditions are minimized or eliminated.

The method of my invention includes displacing a portion of an airstream in a direction substantially normal to its original flow path, sensing and converting the momentum flux of the displaced portion of a force corresponding to said momentum flux providing a signal corresponding to the force and controlling the signal produced whereby zero drift conditions are minimized or eliminated.

DESCRIPTION OF THE PREFERRED EMBODIMENT(S)

Figure 1:
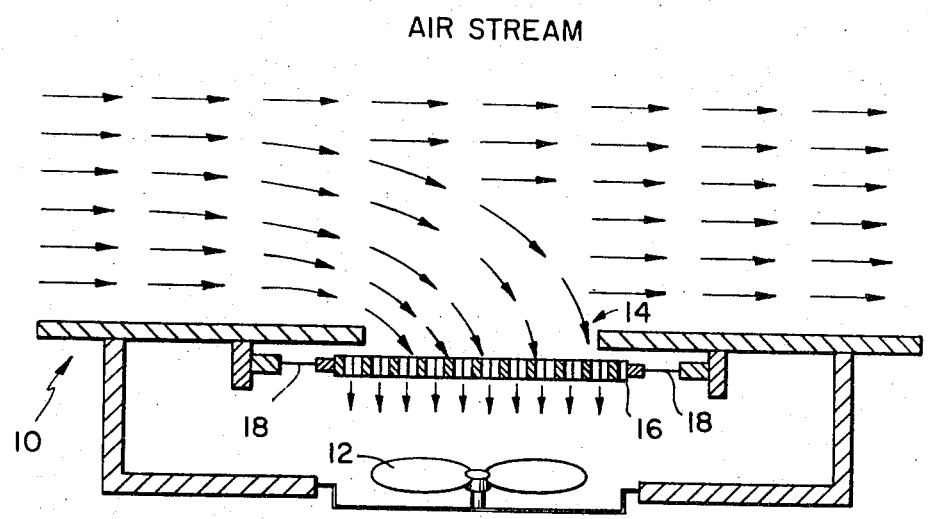
FIG. 1 is a schematic illustration of a preferred embodiment of my invention.

The basic invention of the parent application is shown in FIG. 1 wherein a portion of the environmental airstream, carrying its proper momentum, is drawn into a device 10 from which it emerges with no horizontal momentum and thus exerts on that device a force equal to the momentum flux of the indrawn air, in such a manner that the force may be measured Referring to FIG. 1, a fan 12 or other suitable device draws air through an inlet 14 and through a honeycomb of vertical passages 16 in the throat of the inlet so that the air emerges from the honeycomb with no horizontal momentum therein. The horizontal momentum flux of the indrawn air is then exerted as a horizontal force against the freely suspended honeycomb so that a wind causes the honeycomb to be thrust in the downwind direction by a force equal to the components of horizontal momentum flux of the indrawn air. Strain gages 18 measure the horizontal force on the honeycomb 16. If the airstream has a horizontal velocity of 10 cm/sec and is drawn through the honeycomb with an area of 0.1 m$^2$ at a rate of 100 gram/sec, the momentum flux and therefore the horizontal force exerted on the honeycomb is 1,000 dynes, equivalent to a weight of about 1 gram. This is an amplification of about 170 times over the force exerted by the wind on an object the size of such an inlet. This embodiment is particularly advantageous in that it includes the property of being an "absolute" instrument requiring no calibration; there is an exact equality, not simply proportionality, between the momentum flux of the indrawn air and the force exerted on the inlet, and the latter is therefore an absolute measure of the former regardless of the geometric details of the device or of frictional losses in the airstream.

Figure 2:
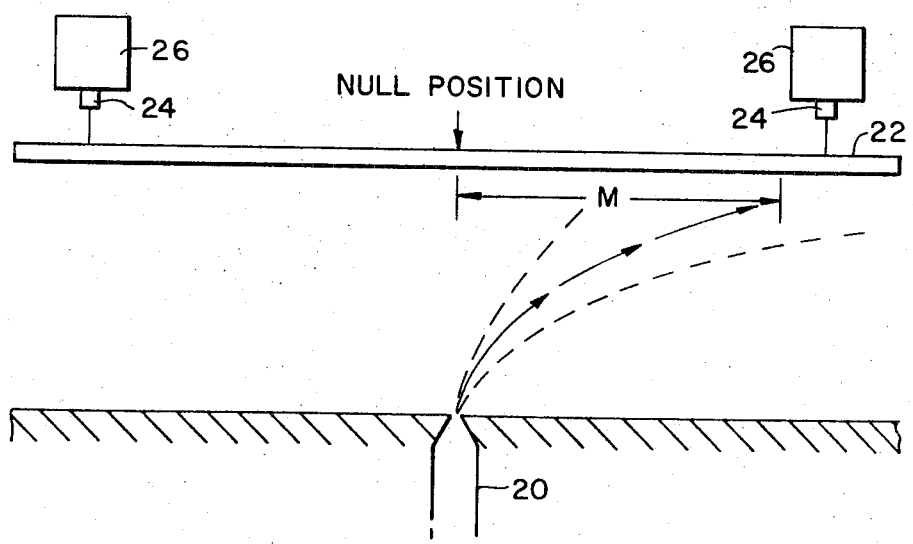
FIG. 2 is a schematic illustration of an alternative embodiment of my invention.

An alternative embodiment of the basic invention is shown in FIG. 2 wherein a jet of air from a source 20 is projected vertically into the environmental air or airstream moving horizontally past it. The jet entrains a portion of the airstream in the wakestream of the jet so that at a distance from the source 20 the wakestream contains both the vertical momentum delivered to it by its source and conserved thereafter, and the horizontal momentum of the entrained air. The core of the wakestream becomes tilted at an angle, as shown by the arrows, the tangent of which is the ratio of the horizontal to the vertical momenta, causing the wakestream core to follow a parabolic curve in the downwind direction, that is to the right as shown in FIG. 2. The jet is directed through a predetermined thickness, such as for example 35 cm, of the airstream from the source to impinge on a flat plate 22 engaged to vertical-force transducers 24 which in turn are secured to supports 26. The plate 22 as shown is normal to the original direction of the jet. The momentum flux of the wakestream core is converted into a force exerted on the plate 22 the center of the force being the locus of the jet core. Deflection of the core from its null position therefore generates a force moment about the null position equal to the jet momentum flux times the length of its deflection from the null position. If the jet momentum flux is 10$^3$ dynes, and the wind speed is 10 cm/sec, for the example of FIG. 2, the deflection of the core from its null position will be about 1 cm and the force moment $10^3$ dynes-cm or about 1 gram-cm. This is about 200 times the force that the same wind speed would exert on a flat plate the size of the impact area of the wakestream, and represents a magnification of force through utilization of the momentum of the environmental air entrained into the wakestream as a means of controlling the wakestream.

The basic invention, of course, may employ any type of transducer which would convert the force acting on an element into a signal that may be measured; for example, a spring balance, a strain gage, or other device that will occur to persons skilled in instrumentation, strain gages which may be used with the invention would include, for example, a gage such as manufactured by BLH, Inc., Waltham, Mass., Model No. FAE-03G-12-59.

In FIG. 2, the air jet has been shown being directed in a direction normal to the airstream and normal to the transducer 24. Of course, the air jet may be directed normal to the transducer and at an angle to the airstream or normal to the airstream and at an angle to the transducer or at an angle to both the airstream and the transducer. However, embodiments where the air jet is not in a direction normal to both the airstream and the transducer would involve additional calculations.

Further, the particular design of FIG. 1 shows a circular inlet 14 directly over the honeycomb 16. Other embodiments may be employed. The orifice may be of a noncircular configuration and the orifice may be flared. Also, other devices may be used for measuring the force exerted on the flat plate in the second embodiment and the honeycomb in the first embodiment which may vary from a simple spring balance, sets of strain gages, coupled with means of exerting a restoring force equal and opposite to the force exerted by the wind.

Since the honeycomb sensing element in the anemometer system of FIG. 1 can be wholly enclosed in a housing, and since the force exerted on it can be reduced by reducing the amount of air through it, this anemometer lends itself to "ruggedization" for use in extremely severe wind situations such as hurricanes and tornadoes, making measurements in the wakestream of a jet engine, etc. For some of these applications, it is advisable to adopt some such arrangements as shown in FIGS. 3 and 4.

Figure 3:
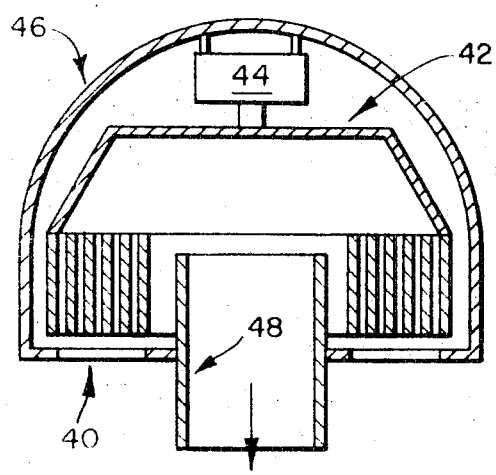
FIGS. 3 and 4 are schematic illustrations of the invention employed with high wind velocities.

In FIG. 3 a honeycomb 40 on support 42 connected to strain gage system 44 is protected by housing 46 that is firmly connected by stand-offs (not shown) to steel pipe 48 that serves as support and is connected to suction system (not shown) to draw air through the honeycomb.

Figure 4:
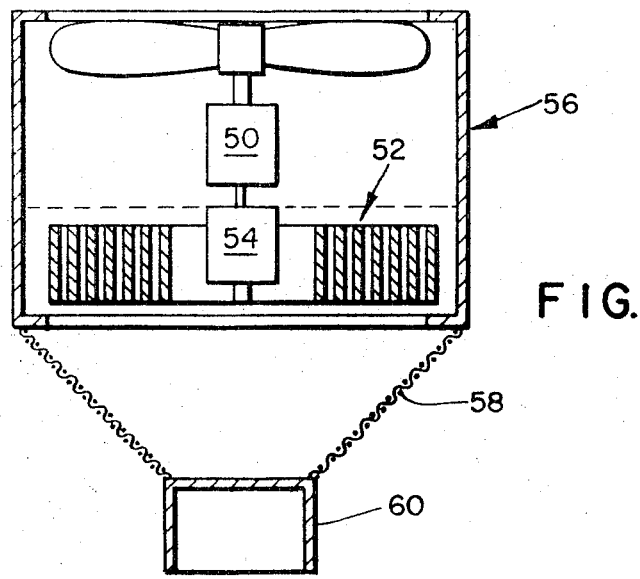

In FIG. 4 air is drawn by motor and fan 50 upwardly through honeycomb 52 which is mounted on force balance 54. Housing 56 is supported on open grill of rods 58 from base 60.

Figure 5:
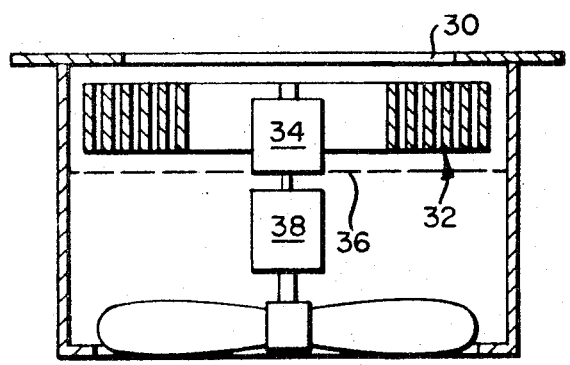
FIG. 5 is a schematic illustration of the invention used to measure the air vorticity.

The basic invention may also serve a further object; namely, measuring the vorticity of the airstream. The vortical momentum flux of the air entering the honeycomb exerts a torque on it that may be measured by a suitably arranged strain gage system. Referring to FIG. 5, vorticity momentum flux of air entering aperture 30 is converted by honeycomb 32 to a corresponding torque sensed by torque sensor 34 supported on support 36. Fan and motor 38 draw air through the honeycomb. Sensor 34 may be combined with sensors of horizontal forces for use simultaneously as a regular anemometer. Accordingly, a device has been provided wherein the force transduced from a sample of the airstream is proportional to the first power of the wind speed and thus produces very large forces acting on the device at low wind speeds in comparison with the dynamic pressure of the wind.

Figure 6:
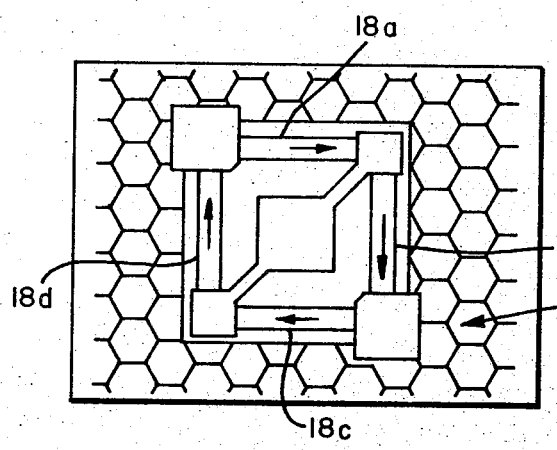
FIG. 6 is a schematic illustration of the force balance employed in the preferred embodiment of the invention.
Figure 7:
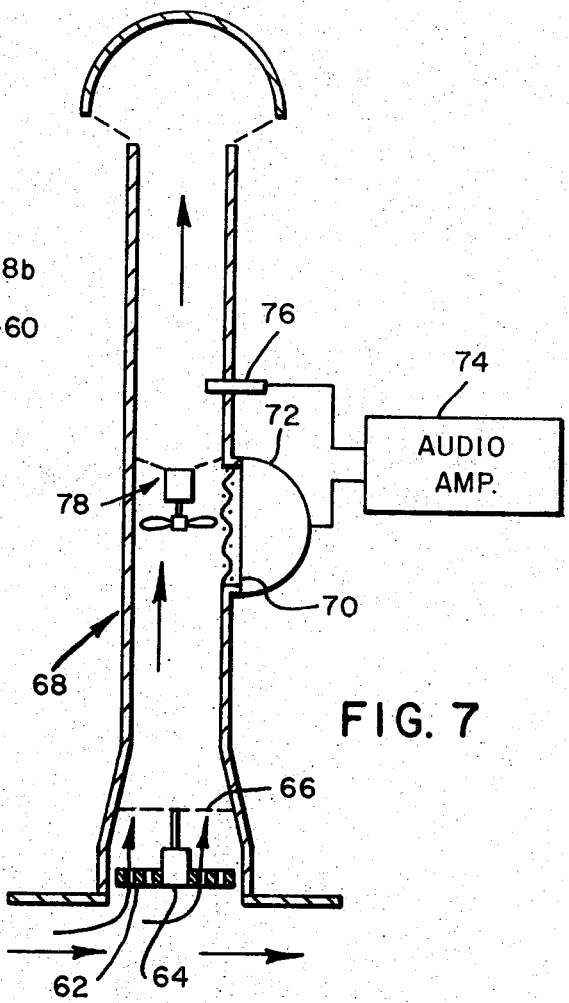
FIG. 7 is a schematic of the preferred embodiment of the invention.

Referring to FIG. 6, a force balance is shown which comprises four strain gages 18a, b, c and d, which force balance is used in the preferred embodiment of FIG. 7, and may, of course, be used in any of the embodiments of the invention. The strain gages provide electrical outputs proportional to the lengthwise force exerted on them. The difference of output between each opposite pair gives the rectilinear components of the net horizontal force, while the sum of all four outputs taken over an arm length of half one side of the square gives the force couple about the vertical axis generated by the vorticity.

The preferred embodiment of the invention is shown in FIG. 7 and comprises a honeycomb 62 secured to a force balance 64 which balance is secured to support 66. These elements are mounted in the mouth of conduit 68, which conduit has openings at either end thereof. Near the center of the conduit 68, arms 70 are provided on which is mounted the driver unit of a horn-type speaker 72, such as an Electro-Voice 1828 R connected to an audio power amplifier 74 such as a Bogen Model CHB 10A equipped in the usual manner with a volume control. A sensor 76, such as a microphone, is secured to the conduit wall and connected to the aforesaid power amplifier. The microphone, amplifier and speaker provide an oscillating system that produces an acoustic oscillation within the pipe at a frequency such that the length of the pipe is half the wavelength of the acoustic oscillation. A small fan 78 is mounted near the center of the conduit 68, drawing a stream of air in through the honeycomb 62 and expelling the air from the other end.

In the operation of the invention a first airstream of environmental air passes over the lower opening of the conduit 68 as shown in FIG. 7. The fan 78 is actuated generating a second airstream to draw the momentum flux of the first airstream through the conduit 68. The horizontal component of the momentum flux acts on the walls of the honeycomb 62 and the force balance 64 produces a signal corresponding to said force or displacement.

The speaker driver 72 produces a pressure oscillation at the center of the conduit 68. In the preferred embodiment of the invention, the oscillatory component of the momentum flux per unit volume of the air drawn inwardly through the honeycomb is independent of the density variations of the air, such as may be caused by changes of ambient temperature or pressure. This condition is achieved, for instance, when the output of the amplifier 74 is regulated through its volume control in such a manner that the square of the amplitude of the said pressure oscillation divided by the power delivered by the speaker 72 is held constant. This regulation may be accomplished, for example, by appropriate design of the volume control circuit of the amplifier 74 using well-known analog principles of control. Then, the magnitude of the alternating signal generated by the strain gauges in the force balance 64 is made proportional only to wind velocity and invarient with the density.

The fan 78 serves to maintain a more or less constant inflow of air through the honeycomb 62 upon which the oscillatory component of air velocity is superimposed. The strength of this inflow of air is made sufficient so that the outward-directed branch of the oscillatory motion does not carry air that is inside the honeycomb (to which it has surrendered its horizontal momentum flux in the form of a force) back to the outside of the pipe from whence it may be drawn into the honeycomb again as "dead" air during the next inward-directed branch of the oscillatory motion.

The fan may be replaced by any convenient device for creating the second airstream within the conduit, such as a jet of air that imparts its momentum to the air in the conduit, or (if the conduit is more or less vertical) a heater that renders the air inside the conduit buoyant.

The amplitude, A, of the oscillatory motion of the air in the open end of the pipe, the frequency, $f$, of the oscillation, and the maximum velocity, $v$, of the air motion, are connected by the relationship $$V = 2 \pi A f$$

whereas the frequency, $f$, and the length L, of the pipe are connected by the relationship $$2Lf = C$$

where C is the velocity of sound.

From these relationships a variety of choices can be made for the design variables, bearing in mind that the frequency should not approximate the frequency of a likely interfering signal such as the ubiquitous 60 Hz power-line frequency. The oscillator velocity at its maximum probably should not exceed the average indraft velocity available from the fan, and that the osilllatory amplitude preferably should exceed about three times the diameter of the honeycomb passages (though a considerably smaller amplitude might result in satisfactory operation). Thus, for example, if the velocity of sound is 330 meters/second and the density of the air is 1 kilogram/meter$^3$, a pipe 1.8 meters long will have a resonant frequency of 90 Hz. A pressure amplitude of 1 N/m$^3$ (10 microbars) at the center of the pipe will produce an oscillation of 0.0025 meters (2.5 mm) amplitude at the open end, and the maximum oscillatory component of velocity will be 1.4 meters/second, permitting use of a honeycomb with passages of nominal diameter 0.00083 meters (0.83 mm). Alternatively, in a 6-meter pipe (resonant frequency 27.5 Hz), the same pressure oscillation would produce an oscillatory amplitude of 0.008 meter (8 mm) with no change in maximum oscillatory velocity.

As an example of the above, assume that the conduit has a length of 2 m and that the honeycomb has a cross-sectional area of $5 \cdot 10^{-4}$ square meters (5 cm$^2$). Assume further that the driver system produces an oscillatory component of velocity of 1.4 meters/second through the honeycomb. The velocity through the honeycomb will then vary between 0.3 and 1.7 meters/second with a frequency of 83 Hz. Assume now that air with a density of 1 kg/meter$^3$ blows as a natural wind of 1 meter/second past the end of the conduit in which the honeycomb is mounted. The force on the honeycomb will then fluctuate between $1.5 \cdot 10^{-4}$ and $8.5 \cdot 10^{-4}$ N, creating an alternating force component with an amplitude of $7 \cdot 10^{-4}$ N (70 dynes) that will be sensed by the force balance and converted to an alternating signal with a frequency of 83 Hz.

The conduit need not be straight as shown in the preferred embodiment. It may be looped or folded in the manner of a french horn or trombone, or may comprise two concentric sections communicating through a common chamber as shown in FIG. 8.

Figure 8:
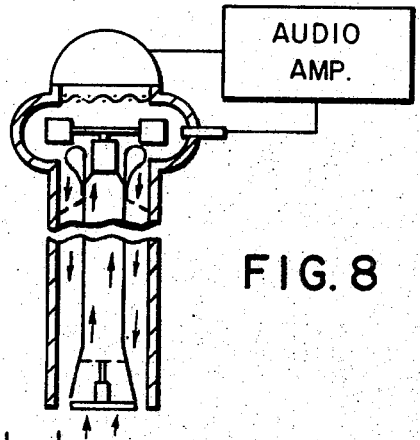
FIG. 8 is a schematic of an alternative embodiment of the invention.
Figures 9A, 9B, 9C, 9D, 9E:
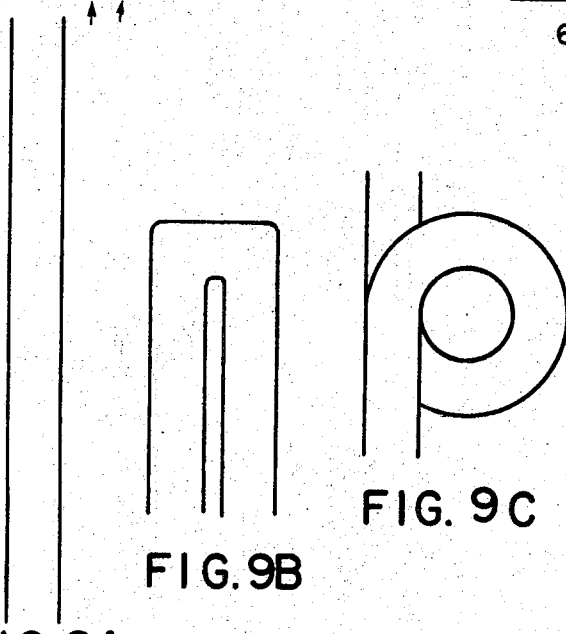
FIGS. 9 a–e are further alternate embodiments of the invention.

In order to avoid interference between the open ends in this configuration, the outer conduit may be folded in the manner shown in FIG. 8 by internal baffles. FIG. 9 *a-e* show a plurality of embodiments of different structural configurations embodying the invention, illustrating (*a*) straight conduit; (*b*) folded conduit; (*c*) looped conduit; (*d*) concentric conduit and (*e*) concentric pipe conduit, outer leg folded over a baffle.

Alternatively a resonant chamber, or Helmholz resonator, may be used in place of the resonant conduit. The ocarina, and an empty pop bottle blown across the mouth, are familiar examples of a Helmholz resonator. In it, a motion node is present along the wall opposite the mouth; this is the preferred location for the speaker driver. The principle of operation remains unchanged.

In situations where the power output of the audio amplifier may be disturbed by external or internal influences, such as fluctuations in line voltage or the aging of critical parts, it is advantageous to stabilize performance by one of several well-known techniques such as inverse feedback wherein the output of the microphone is amplified, compared with a fixed reference power or voltage level, and the difference used to govern the power output of the audio amplifier at a level that just maintains the pre-set level of microphone exitation.

Having described my invention what I now claim is:

1. A device for measuring wind velocity which comprises:
   means to displace a portion of a first airstream from its flow path in a direction substantially normal to said flow path;
   means to sense the momentum flux of the displaced portion of the airstream spaced apart from the means to displace the portion from the airstream in a direction substantially normal to the original path and to convert the momentum flux of the displaced portion of the airstream into a force directly proportional to that displaced momentum flux;
   means responsive to the means to sense and convert to produce a signal representing said force;
   means to convert the signal representing said force to an alternating signal; and
   means to measure the alternating signal.

2. The device of claim 1 wherein the means to displace a portion of the first airstream includes means to generate a second airstream whereby the momentum flux is entrained in the second airstream; and the means to control the signal includes means to control the flow characteristics of the second airstream.

3. The device of claim 2 which includes means to provide a velocity fluctuation and superimpose the wave form of the velocity fluctuation on the second airstream.

4. A device for measuring wind velocity which comprises in combination:
   a. a conduit;
   b. means to displace a portion of a first airstream from its flow path by generating a second airstream in a direction substantially normal to the first airstream whereby the horizontal momentum flux of the displaced portion of the airstream is entrained in the second stream, said means in communication with the conduit;

c. means to sense and convert the displaced portion of the airstream into a force directly proportional to the displaced momentum flux and to provide a signal corresponding to said force disposed in the flow path of the second airstream;

d. means to control the flow characteristics of the second airstream whereby the force of the entrained portion of the airstream acting upon the means to sense and convert is varied; and e. means to measure the signal produced.

5. The device of claim 4 wherein the means to control the flow characteristics of the second airstream includes an audio oscillator which generates an acoustical oscillation the wave form of which is superimposed on the second airstream.

6. The device of claim 4 wherein the means to displace the portion of the airstream is centrally disposed in the conduit and the means to sense and convert the displaced portion of the airstream is axially aligned therewith.

7. The device of claim 5 wherein the audio oscillator is centrally disposed in the conduit whereby the wave form generated is approximately twice the length of the conduit.

8. The device of claim 4 wherein the means to displace a portion of the first airstream and the means to modify the wave characteristics of the second airstream are centrally disposed in the conduit, and the means to sense and convert the displaced portion of the airstream is disposed at the end of the conduit.

9. A method for measuring the velocity of an airstream which includes:

displacing at least a portion of a first airstream in a direction substantially normal to the flow path of said airstream to form a second airstream having the momentum flux of the first airstream entrained therein;

sensing and converting the momentum flux of the displaced portion of the first airstream into a force directly proportional to that displaced momentum flux;

providing a signal corresponding to the force; converting the signal provided to an alternating signal; and measuring the alternating signal so provided.

10. The method of claim 9 wherein the signal is modified by:

modifying the flow characteristics of the second airstream.

11. The method of claim 9 wherein the signal is modified by:

generating a velocity fluctuation and superimposing said velocity fluctuation on the second airstream.

12. The method of claim 9 wherein the signal is modified by:

generating an acoustical oscillation and superimposing said oscillatory component of air velocity on the second airstream.

13. The method of claim 9, which includes:

sensing and converting the momentum flux of the displaced portion of the first airstream prior to the second airstream flowing in a path normal to the flow path of the first airstream.

* * * * *